United States Patent
Wirth

[19]

[11] Patent Number: 5,934,418
[45] Date of Patent: Aug. 10, 1999

[54] BRAKE LINING FOR PARTIAL-LINING DISC BRAKES

[75] Inventor: Xaver Wirth, Ismaning, Germany

[73] Assignee: Knorr-Bremse System Fur Schienenfahrzeuge GmbH, Munich, Germany

[21] Appl. No.: 08/817,212

[22] PCT Filed: Aug. 25, 1995

[86] PCT No.: PCT/DE95/01139

§ 371 Date: Mar. 28, 1997

§ 102(e) Date: Mar. 28, 1997

[87] PCT Pub. No.: WO96/12119

PCT Pub. Date: Apr. 25, 1996

[30] Foreign Application Priority Data

Oct. 12, 1994 [DE] Germany .............................. 44 36 457

[51] Int. Cl.$^6$ .............................. F16D 65/092; B61H 5/00
[52] U.S. Cl. ................ 188/73.1; 188/73.2; 188/218 XL; 188/250 B; 188/250 G; 188/217; 188/366; 188/58; 188/250 E; 188/73.37
[58] Field of Search ............................ 188/218 XL, 73.2, 188/73.1, 366, 367, 73.41, 249, 259, 240, 247, 250 B, 250 G, 214, 215, 221.1, 220.6, 234, 220.1, 231, 73.32, 238, 239, 58–59, 250 E, 73.37, 217, 72.3, 166, 216, 83, 72.2; 192/70.13, 107 R, 107 C

[56] References Cited

U.S. PATENT DOCUMENTS

| 2,791,294 | 5/1957 | Bachman et al. |
| 3,198,294 | 8/1965 | Stacy . |
| 3,297,117 | 1/1967 | Freholm . |
| 4,076,106 | 2/1978 | Bermingham et al. ................. 188/73.2 |
| 4,441,592 | 4/1984 | Everett ................................. 188/250 B |
| 4,501,347 | 2/1985 | Cerny et al. ......................... 188/250 G |
| 4,535,874 | 8/1985 | Pollinger et al. ........................ 188/217 |
| 4,611,692 | 9/1986 | Everett .................................. 188/73.1 |
| 4,901,823 | 2/1990 | Chang ................................... 188/73.1 |
| 5,538,108 | 7/1996 | Russo .................................. 188/250 E |

FOREIGN PATENT DOCUMENTS

| 2120392 | 10/1994 | Canada . |
| 0073897 | 3/1983 | European Pat. Off. . |
| 0106782 | 4/1984 | European Pat. Off. . |
| 8514607 | 7/1985 | Germany . |

Primary Examiner—Douglas C. Butler
Attorney, Agent, or Firm—Barnes & Thornburg

[57] ABSTRACT

A brake lining for partial-lining disk brakes, particularly of rail vehicles, wherein several friction or lining elements are provided which can be fastened to a support plate individually or in groups, in which case several support plates are arranged either directly on the lining holder of the disk brake arrangement or on a lining support which can be fastened to the lining holder. For rendering the surface pressure generated during the braking uniform, the support plates are swivellably linked to the lining support or lining holder, in the case of a group-like assignment, several (at least two) lining elements being swivellably arranged on the support plate. In the center of gravity of lining elements which are assigned to one another in groups, the respective direct introduction point of the lining contact pressure forces is situated, in which case centers of gravity of the surfaces of lining element groups assigned to one another in the triangle each have the higher-ranking position of the introduction of force of the brake operating elements.

14 Claims, 8 Drawing Sheets

BRAKE LINING FOR PARTIAL-LINING DISC BRAKES

This application is the U.S. national phase application of PCT International Application PCT/DE95/01139 filed Aug. 25, 1995.

BACKGROUND AND SUMMARY OF THE INVENTION

The invention relates to a brake lining and more specifically to brake lining for partial lining disc brakes.

Large-surface brake linings, for example, rail vehicle disc brakes, have no even approximately constant surface pressure on their friction surface during high-energy braking operations. This is, among others, the result of a non-uniform introduction of force from the brake application device, for example, when dovetail guides are used. It also results from accidentally warmer areas of the surfaces of the lining and the brake disc, because of the thermal expansion of the friction materials, bulge out of their surfaces, in which case these areas are more stressed and, as the braking progresses, therefore become hotter than the adjacent zones. The result of such "hot spots" on the disc and the lining are premature hot cracks on the disc and lining damage because of thermal overloading. Particularly, with respect to hard lining materials (resin-bound materials, metallic sintered materials), the above-mentioned occurrence is extremely pronounced.

For avoiding the above-mentioning disadvantages—mainly when sintered materials are used—brake linings were used which have elastically disposed individual elements (German Patent Document DE-OS 43 01 006). However, in the case of such arrangements, essentially two disadvantages are found: The surface pressures on the individual elements are still not constant; they are a function of the compression corresponding to the respective surface constant of the elastic bedding of the individual elements. In addition, the lining expenses on the whole are very high and therefore result in high costs. The price is four to six times higher than organically bound, one-piece linings.

In the case of a known brake lining of this type (CA-2120392), support plates supporting lining elements are swivellably arranged on a support body in the form of a support plate. The lining elements are in each case rigidly connected with the support plate which, in turn, is riveted to the support plate. Three lining elements respectively are situated in the three corners of such a support plate which has the shape of a triangle. The rivets, which are used for connecting the support plate with the carrying plate, are in each case placed in the center area of the three legs of the triangular support plate so that the free corners of the support plate can carry out pitching movements with respect to the carrying plate to a limited extent. For this purpose, the support plates are provided with weakenings in their center. Because of such a geometry of the positioning of the lining elements and of the fastening of the support plate on the actual carrying plate, the swivel angle as well as the swivel direction of the lining elements is given within a narrow scope; that is, the swivel axis of each lining element remains generally constant. Despite the weakenings situated in the center of the support plates, a certain interdependence of the movements of one lining element with respect to the next one is to be accepted because swivel movements in one corner can be transferred beyond the center of the support plate to the area of the respective adjoining two lining elements. The result are undesirable oblique positions of the lining elements, that is, reactions of a lining element with respect to a track on the brake disc are partially also transmitted to the closest lining elements. In addition, by means of the lining elements, no equal-surface grinding pattern can be achieved because the swivel angles or rotating angles are fixed. The result are "hot spots" on the brake disc because resilient restoring forces, as increased reaction forces, can lead to temperature increases on the disc.

Based on the above, it is an object of the invention to develop a brake lining of the above-mentioned type by constructionally simple devices such that the surface pressure on the friction surface of the brake disc can be rendered more uniform. A clearly defined distribution of the overall brake application force to the individual lining elements is to be permitted. For saving expenses, it must also be possible to exchange the brake linings or parts thereof at reasonable cost.

The objects are achieved by dividing the whole lining into several lining elements or group elements and as the result of the bearing of the lining elements or group elements on a bearing body, including the fixing of the introduction of the brake application force, a uniform distribution of this brake application force to a plurality of individual lining elements or lining blocks is made possible. In addition, the lining elements or group elements form small exchangeable units, which constitutes a significant reduction of price in contrast to conventional brake linings with a dovetail guide. In the case of lining elements arranged symmetrically with respect to the center line of the bearing body (lining support or lining holder) or lining groups formed of lining elements, the division of the overall lining into two half linings is possible, in which case one lining element per support plate can be provided as the smallest lining unit. The lining elements or the groups formed by them (group elements) with the support plate carrying them can be arranged either on a common lining support or directly on the lining holder. The type of the bearing of the lining elements on the support plates, the type of the bearing of the support plates on their support, the lining support or the lining holder as well as the type of the introduction of the brake application forces with respect to the formed centers of gravity are responsible for rendering the surface pressure uniform. Preferably, the bearing of each individual element, thus of each lining block on the support plate, consists of the pairing of a ball socket with a universal ball joint which is constructed such that the resulting force consisting of the contact pressure force on the brake lining and the friction force perpendicularly thereto is in each case perpendicular to the spherical surface existing on the ball socket. In this case, the resultant force extends through the center of gravity of the surface of the respective lining element in the area of the friction on the brake disc. When the surface pressure on the overall lining is rendered uniform, thus the loading of the brake disc is more uniform, a higher energy absorption of the disc is permitted when the temperature limit is reached. The wear is also lower because the wear rises superproportionally with the temperature and, when the temperature is rendered uniform or reduced, a reduction of the wear is achieved. Naturally, when the surface pressure is rendered uniform and the brake disc loading is more uniform, the danger of the formation of hot cracks is also reduced.

Another important advantage of brake linings of the above-mentioned type are the much more favorable operating costs since the individual lining elements or group elements formed of lining elements are considerably less expensive than the previously used dovetail lining elements in the element construction or overall construction. While, in the case of one-piece brake linings of the known type but also in the case of newer multi-part brake linings, it is required to exchange during a lining exchange also the comparatively expensive lining support, because of the division into lining groups or individual elements, in each case supported by a low-cost support plate, it is possible to reuse the lining support after another fitting with lining elements or lining element groups. In their overall arrangement, the lining elements preferably form a ring sector surface which is advantageous with respect to the braking geometry, whereby a lower concave running slope of the disc must be accepted. The friction elements or lining elements may have a circular shape, but may also have a polygonal form. In addition, they may have torsional resistances or may be shaped such that they mutually support each other in a locking manner against torsion.

In an advantageous further development, three individual elements respectively can be combined to form a common lining element, which is useful in the case of rubber-based organic lining materials. It is possible to fasten the lining elements in a multiple and articulated manner on their direct support, that is, on the support plate; thus, by means of riveted joints, weld point connections, screwed connections, etc. The targeted introduction of the brake applications forces on a brake lining of the type to be used is of special significance. Thus, the introduction of loads from the brake application device can take place by a ball joint, specifically in each case in the center of gravity of a half-lining. It is also possible to introduce the overall brake application force by way of a balance arm which distributes the brake application force from a common lever uniformly to both half-linings.

In the case of one-piece support plates as lining supports for the lining elements or group elements, a certain swivellability is possible in the area of the common center line of the support, for example, as a result of a weakening of the material. This ensures that the lever forces pressing in the center of gravity of the two half-linings are uniformly distributed on the triangle points or centers of gravity of the individual or group elements (statically determined resolution of forces).

Advantageous developments and further developments are listed in additional claims.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
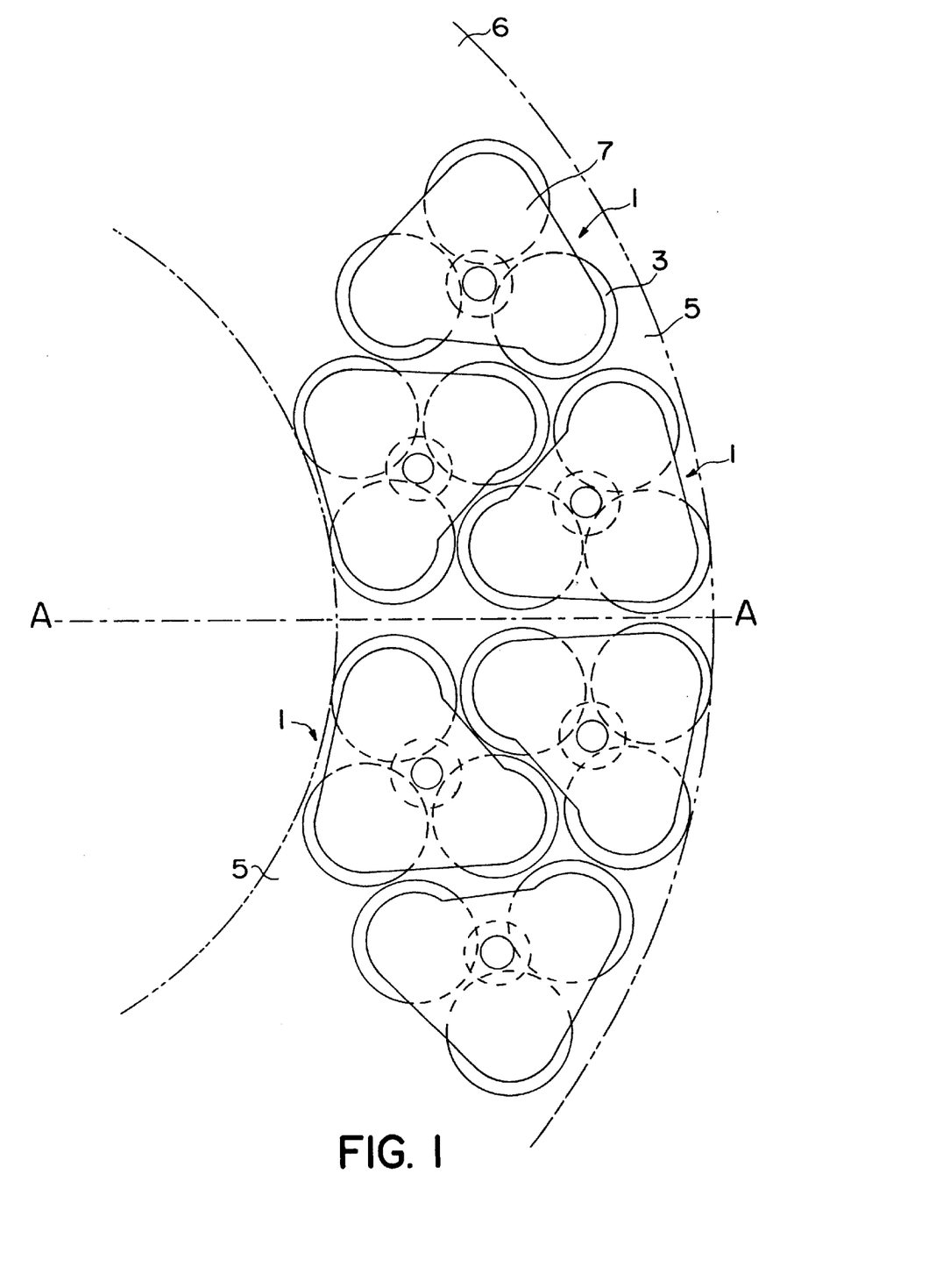
FIG. 1 is a schematic view of the brake lining consisting of several group elements with respect to the friction surface of a schematically indicated brake disc, in which case, for showing the geometric assignment, the lining support and the lining holder are not shown.

FIG. 1 of the drawing shows a brake lining consisting of several group elements 1 with lining elements 3 in its assignment to the friction surface 5 of a brake disc 6 indicated in its circumferential lines and consisting, for example, of steel. The group elements 1 are in each case formed of the lining elements 3 and a support plate 7 supporting them. In the illustrated embodiment, there a 6 group elements 1 of this type with three lining elements 3 constructed as braking blocks; thus there are a total of eighteen lining elements 3. The lining elements are preferably arranged in their overall surface as a ring sector surface, as illustrated in FIG. 1 and may, for example, consist of a sintered metal.

In the embodiment according to FIG. 1, three friction or lining elements respectively are arranged on a support plate 7 in a manner explained in the following. The shown support plates 7 have, for example, a triangular shape, in which case the lining elements 3 are linked with a certain degree of swivelling freedom to the side of the support plates 7 facing the friction surface of the brake disc.

Figure 2:
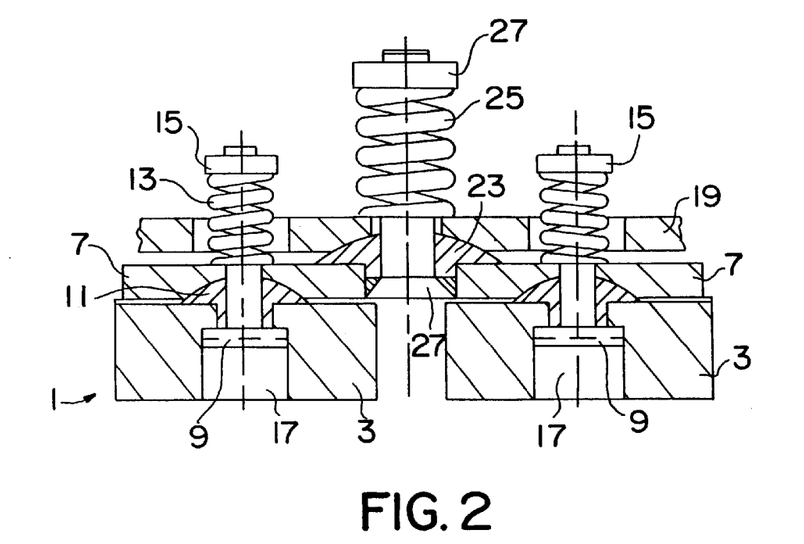
FIG. 2 is an individual sectional view of Line II—II in FIG. 3 showing the linking of two lining elements to a support plate and its assigned to the lining support.
Figure 3:
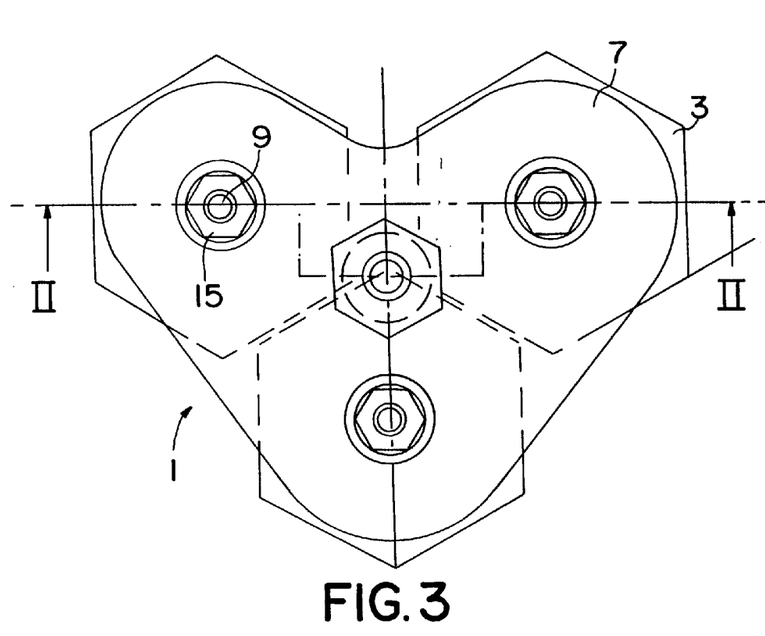
FIG. 3 is a top view of the arrangement according to FIG. 2.
Figure 4:
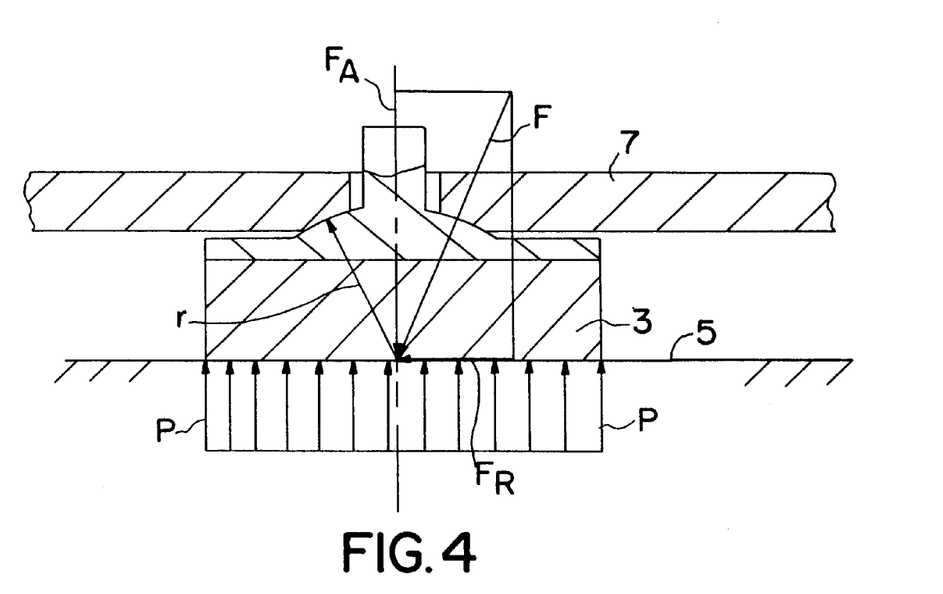
FIG. 4 is a diagrammatic individual sectional view which is enlarged with respect to FIGS. 2 and 3 and which shows the force on an individual lining element in its assignment to the support plate.

According to FIG. 2, which illustrates a cross-section line II—II in FIG. 3, each of the lining elements 3 is linked to the support plate 7 by a countersunk screw 9, a spherical cap 11, a pressure spring 13 and a nut 15. The countersunk screw 9 is situated in a center recess 17 of the lining element 3 and extends in the shown manner through bores of the spherical cap 11 and of the support plate 7. With the interposition of the pressure spring 13, a counterscrewing by the nut 15 is provided. The spherical cap 11 is inserted into a shell-shaped recess of the support plate 7; the bearing of each lining element is therefore formed by a ball socket and a universal ball joint. According to FIG. 4, which schematically shows the guiding of one of the lining elements on the support plate 7, the forces $F_R$ as the friction force and the contact force $F_A$ act upon the lining element 3, by means of which the resulting force F is formed. This force F extends in each case perpendicularly to the spherical surface of the ball socket. The center point of the radius r is placed in the center of gravity of the friction surface of the lining element 3. The resulting force F therefore extends necessarily through the center of gravity of the surface of the lining element. Only in this manner can an approximately constant surface pressure P of the lining element 3 be achieved with respect to the friction surface 5 of the brake disc.

The arrangement of the lining blocks or lining elements on the support plate 7 discussed with reference to rendering the contact pressure force uniform also applied in the same manner to the arrangement of the individual support plates 7 on a lining support 19 in the form illustrated, for example, in FIG. 5. The lining support 19 is provided as a support plate in order to hold the support plates 7 schematically illustrated in FIG. 1. In this case (FIG. 2), a screw 21, a spherical cap 23, a pressure spring 25 and a nut 27 are again assigned to each of the support plates. The individual support plates 7 are therefore mounted in the same manner as the lining elements with a certain degree of swivelling freedom on the lining support 19. As a bottom view, FIG. 5 shows three of the support plates 7 on a lining support 19, which support plates 7 each have three lining elements 3 arranged on them.

Figure 6:
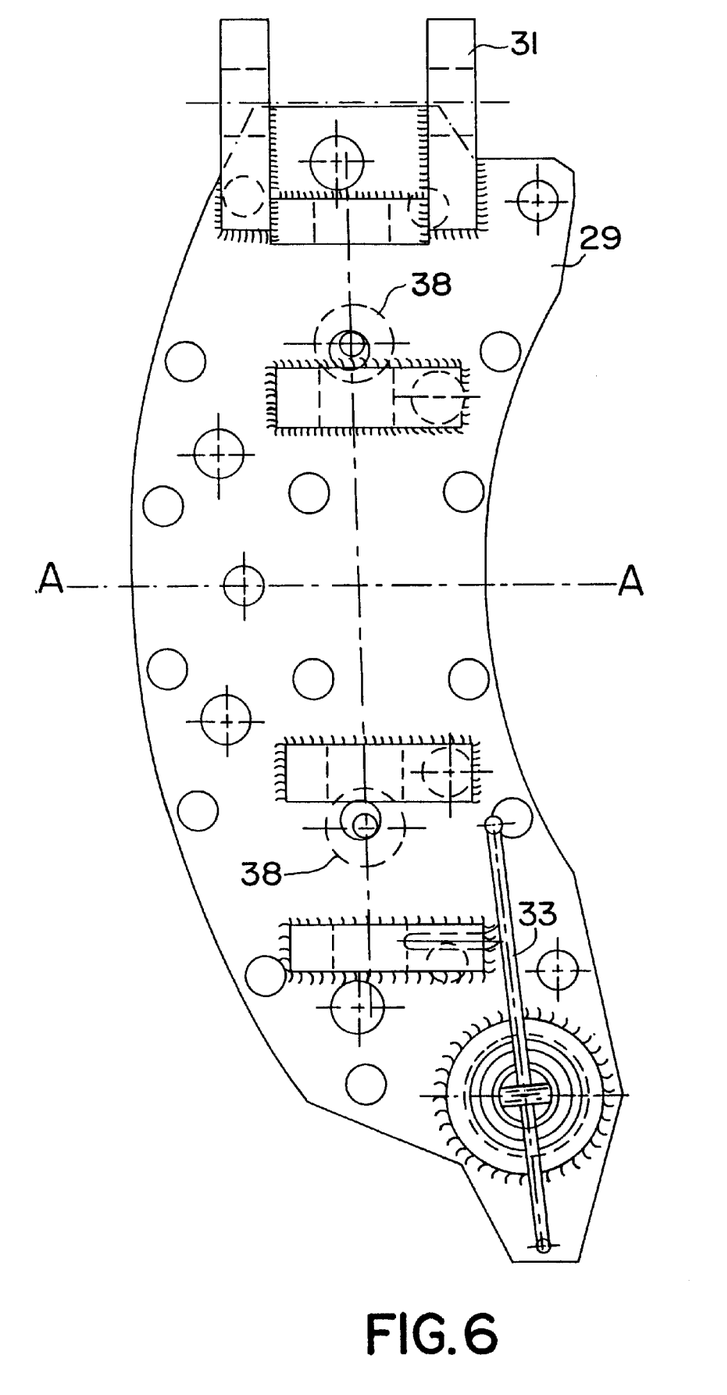
FIG. 6 is a longitudinal view of a lining holder used for holding the lining support according to FIG. 5.

The lining support 19 with the eighteen lining elements arranged on it can, in turn, be mounted on the lining holder 29 illustrated in a rear view in FIG. 6. The lining holder 29 has eyes 31 which are used for the suspension on a hanging lug and carries the lining support 19 of an essentially comparable configuration on its side facing the brake disc. For this purpose, the lining holder 29 is provided, for example, on its end, which is on the bottom in FIG. 6, with a bolt which can be braced by a spring clip 33 and which, on the side facing away with respect to the representation according to FIG. 6, reaches through one of the eyes 35 of the lining support. Additional fastening elements (not shown) extending from the lining support 19 can be guided through openings of the lining holder 29 and can be screwed together with respect to the lining holder 29. The lining support 19, together with the lining elements 3 arranged on it, can thereby be demounted rapidly from the lining holder 29 since, after the detaching of the above-mentioned fastening elements or the pulling-out of the holding bolt which can be braced by the spring clip 33, a pulling-off of the lining support 19 transversely to the lining holder 29 is made possible.

Figure 5:
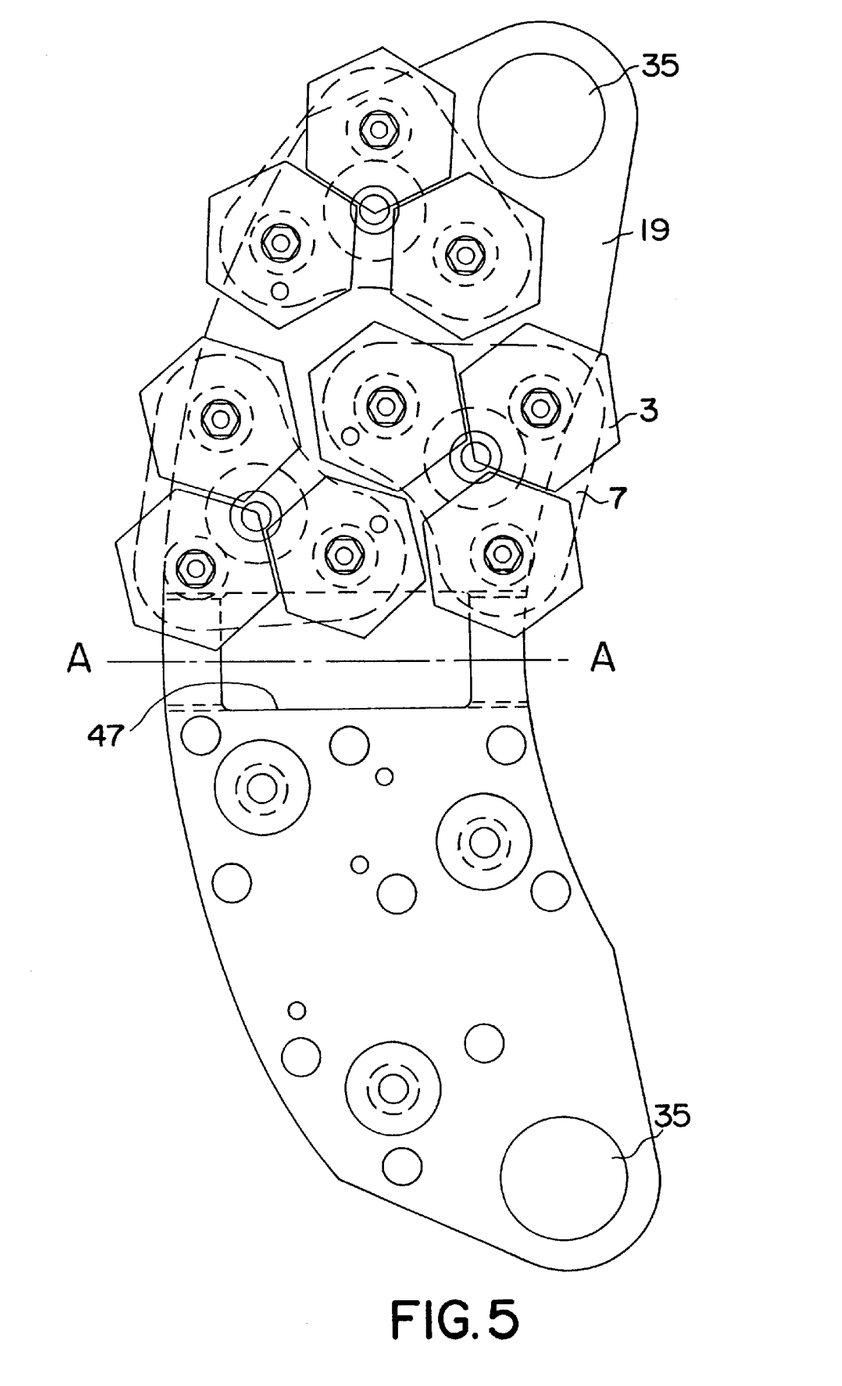
FIG. 5 is a bottom view of a lining support with group elements linked to it which each consist of a support plate with three lining elements respectively.

The support plates 7 with the lining elements 3 were explained as being held on a lining support 19 with reference to FIGS. 2 and 5, in which case the lining support 19 itself can be fastened on a lining holder 29 (FIG. 6). For certain applications, a direct fastening of the support plates 7 on the lining holder 29 (FIG. 7) is also provided.

Figure 7:
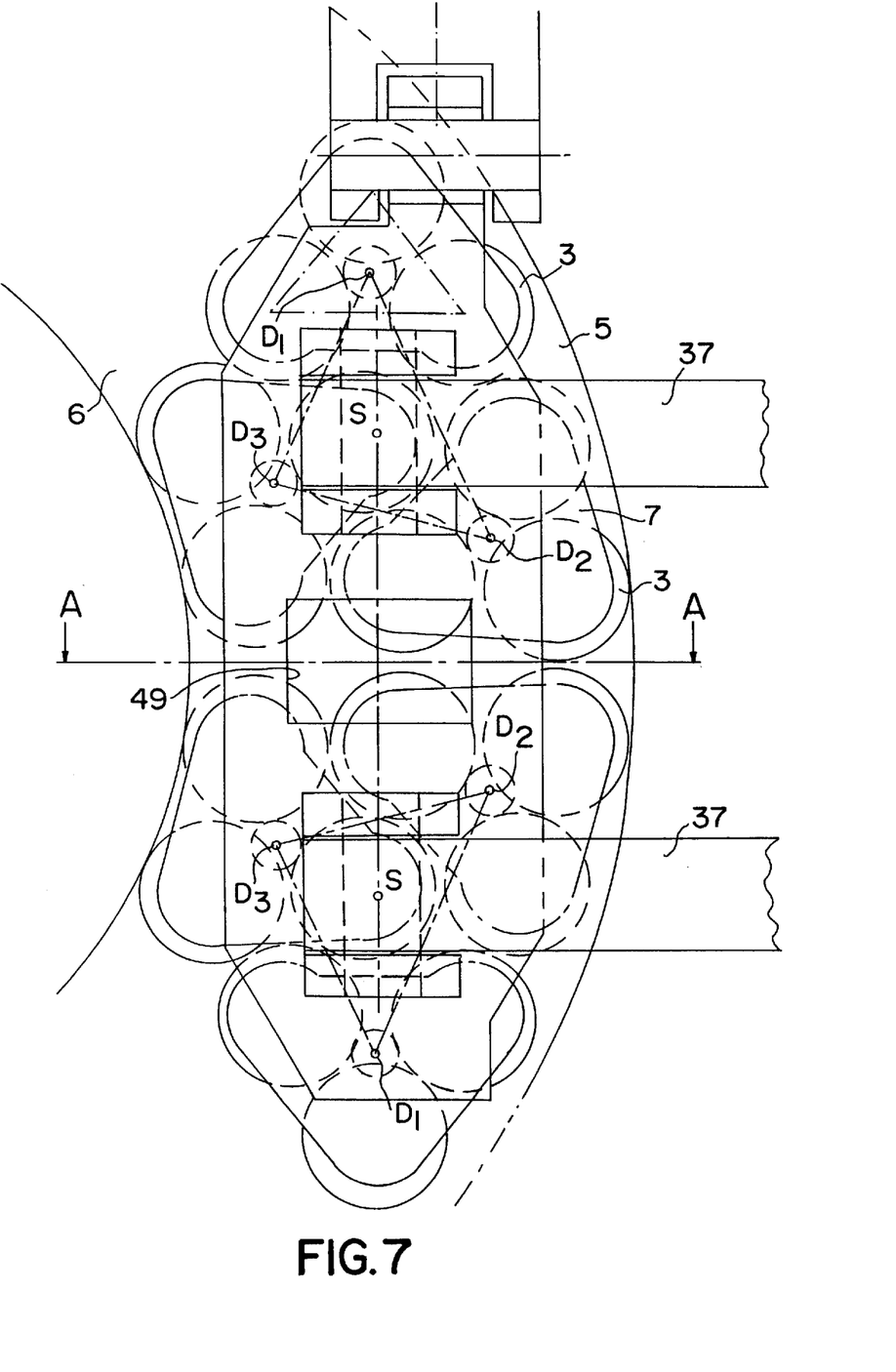
FIG. 7 is a diagrammatic view with respect to FIGS. 5 and 6 of a lining holder showing the centers of gravity D1, D2 and D3 formed by directly linked group elements and the joint centers of gravity formed of the centers of gravity of the group elements for the introduction of half the brake application force per lining half.

An important characteristic of the holding of the lining for the purpose of rendering the surface pressure uniform is the geometric arrangement of the individual lining elements 3, of the support plates, carrying them and their arrangement on a support body (lining support 19 or lining holder 29). The direct holding of the support plates 7 on a lining holder 29 illustrated schematically in FIG. 7 shows that the individual group elements 1, which consist of three lining elements 3 each carried by a support plate 7, have a common center of gravity D1, D2 and D3 as the introduction point of the lining contact pressure forces. The centers of gravity D1, D2 and D3 of the three group elements 1, in turn, form a triangle whose center of gravity S forms the force introduction point of half the overall brake application force per lining for each disc side. In this case, it should be assumed that two half linings with nine lining elements respectively on three support plates respectively are conceivable on both sides of the center axis A—A. Therefore, two centers of gravity S exist for each overall lining. The load introduction points of the brake levers 37 shown schematically in FIG. 7 or corresponding pressure points of hydraulic or pneumatic brake pistons (not shown) are situated at both centers of gravity S. Preferably, one spacer respectively is provided in the area of the introduction of force, that is, in the area of the center of gravity S, such that an almost punctiform transmission of forces is permitted from the lining holder 29 to the lining support 19. The spacers can be formed on one of the mutually facing surfaces of the lining support 19 or the lining holder 29. The contract pressure forces, which are introduced by the brake levers 37 to the halves of the overall lining which are on the top and on the bottom in FIG. 7 and which in each case correspond to half the overall brake application force per lining, are introduced therefore by way of the centers of gravity S or D1, D2 and D3 uniformly into the support plates 7. The support plates 7 and the lining elements 3 arranged on them have the above-explained bearing so that, on the whole, the surface pressure of the overall lining becomes uniform. On the whole, a more uniform brake disc loading is achieved (constant energy supply by way of the friction surface) and the danger of a hot crack formation is therefore reduced. An additional important advantage is the no-squeal braking performance of the lining elements because they will not "rise" because of their bearing according to the invention.

As far as the introduction of loads to the lining holder is concerned, it can be provided from both sides of the brake application device by way of a ball-and-socket joint, specifically in each case in the center of gravity of a half lining, as explained above with reference to FIG. 7. The division of the lining into two half linings, when in each case half the brake application forces are introduced, requires that a certain inherent mobility is possible between the two halves of the lining support (FIG. 7). FIGS. 5 and 7 show that, in the area of the center line A—A of the lining support 19 or lining holder 29, a weakening of the material formed by a window or a recess 47, 49 is provided such that the halves of the lining support or holder can be swivelled to a limited extent with respect to the center line A—A, which, in conjunction with the center-of-gravity-related introduction of forces, contributes to the fact that the contact pressure forces become more uniform. For the purpose of the introduction of the brake application forces, it is particularly important to operate by means of a balance arm which can uniformly distribute the brake application force from a common lever to both half linings. In this case, the common lever extends in the center to the lining support 19 or lining holder 29.

Figure 8:
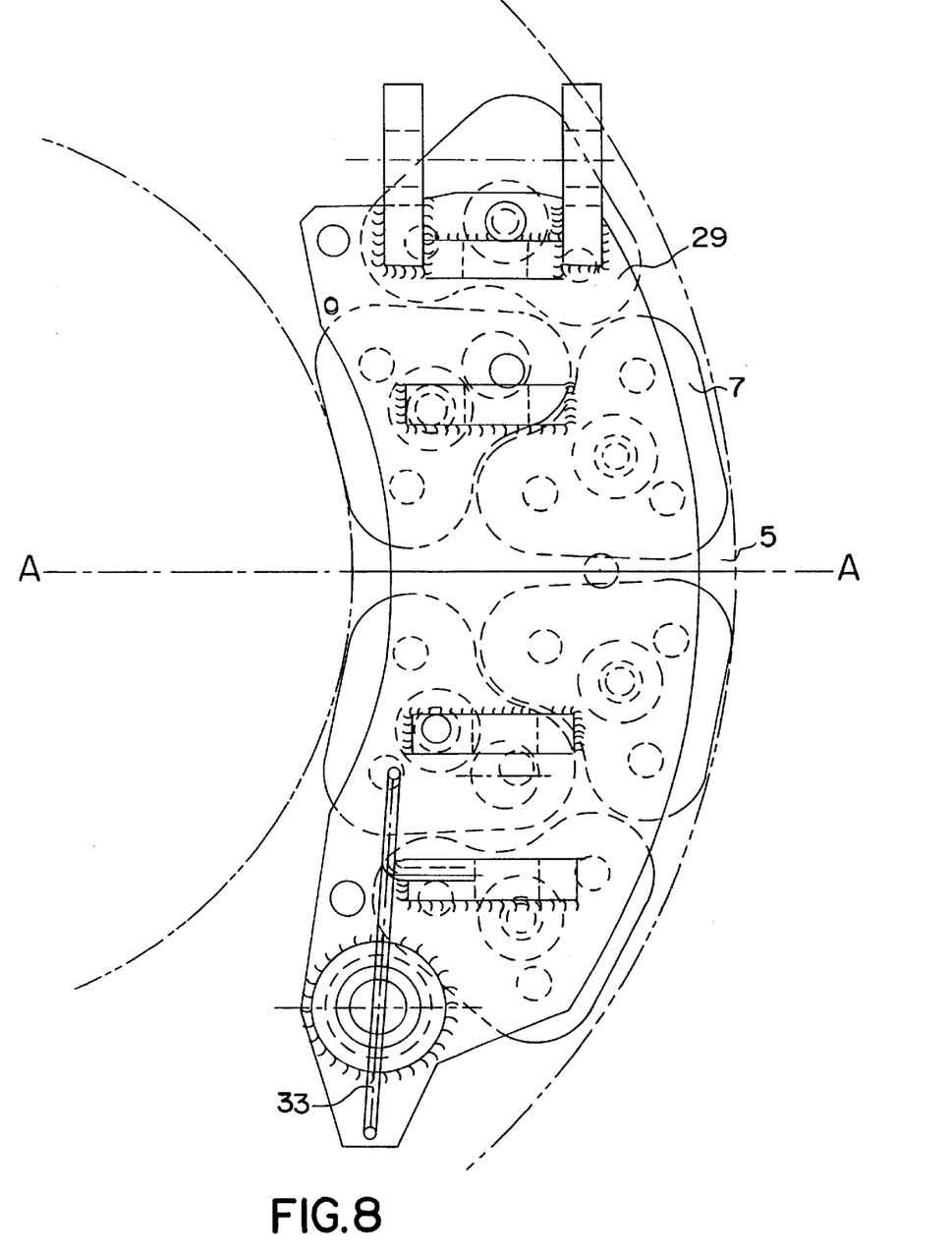
FIG. 8 is a view of a lining holder which can be compared with FIG. 7 and has lining elements which are arranged directly on it, in which case three individual elements per support plate are in each case combined to form a common lining element.

The lining elements 3, which are shown to be hexagonal in FIGS. 2, 3 and 5, may have any other configuration. They may, for example, be round, which is shown schematically by FIGS. 1 and 7. Although preferably three lining elements 3 are provided per support plate 7, their number can also vary, assuming in each case that the introduction of the contact pressure forces as the result of the geometric assignment of the centers of gravity results in uniformity. It is also possible to combine three lining elements respectively to form a single element. This is useful, for example, in the case of a rubber-bound, organic lining material. FIG. 8 shows such an arrangement. Three heart-shaped lining elements are provided per lining half; therefore, a total of six lining elements which are held by support plates 7. As in the case of the embodiment according to FIG. 7, the support plates 7 are swivellably arranged directly on the lining holder 29, in which case the introduction of force again takes place per lining half in the central center of gravity formed by the individual centers of gravity of the three lining elements.

Figure 9:
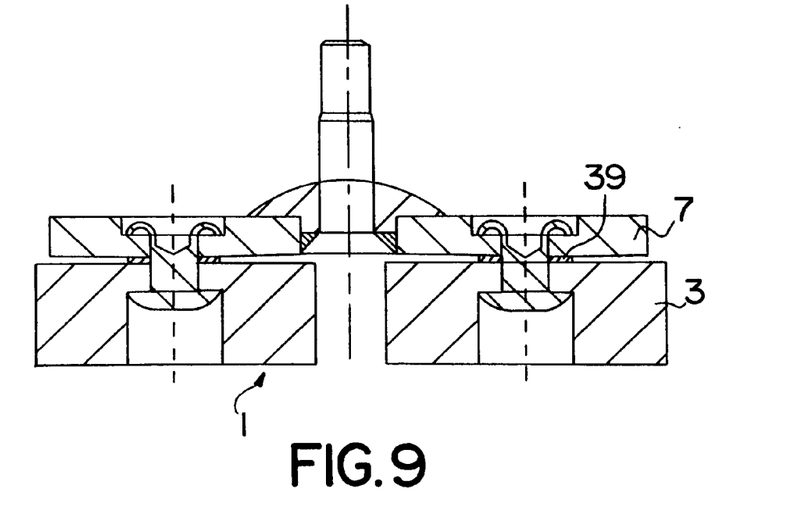
FIG. 9 is a sectional view which can be compared to FIG. 2 and showing a quasi articulated arrangement of the lining elements on the support plate.

According to FIG. 9, the individual elements or lining elements can also be arranged in a "quasi articulated" manner on the support plate 7; thus, for example, by riveting, weld point connection, by a screwed connection, etc. The spacer 39 provided in the embodiment according to FIG. 9, which are each inserted between the lining elements 1 and the support plate 7, permit the required limited swivellability for the purpose of rendering the contact pressure forces uniform. Naturally, it is also possible to construct the individual elements or a portion thereof to be resistant to torsion (for example, by means of a pin and bore).

Figure 10:
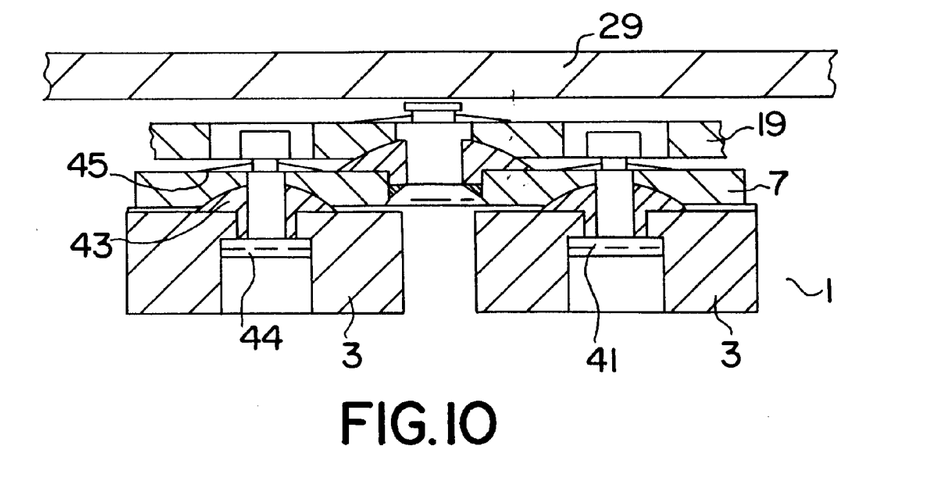
FIG. 10 is a view, which can be compared to FIGS. 2 and 9, of a flat linking of the lining elements to the support plate and the lining support in its assignment to the lining holder.

FIG. 10 of the drawing shows a holding of the lining elements 1 on the support plate 7 and a holding of the support plate 7 on the lining support 19 which are of a much lower depth than in the comparable view according to FIG. 3. Holding pins 41 are provided which are comparable to the countersunk screws 9 and which each reach through bores in the lining element 3, in a spherical cap 43 and in the support plate 7. The cup springs 45 reach behind the holding pins 41 such that the lining elements are pulled to the support plate 7 by spring force. The holding and bracing of the support plate 7 with respect to the lining support 19 is constructed in the same manner. The advantage of the arrangement according to FIG. 10 is that, for demounting the lining support 19 from the lining holder 29, no vertical movements are required relative to it. After the detaching of the pin holding arrangement indicated with reference to FIG. 6, the lining support 19 can be pulled off laterally or on the front side. As a result, it is very simple to detach the lining support 19 without demounting the lining holder 29 so that a complete exchange of the lining support 19 can be carried out within a very short time. As required, it is also possible to exchange individual lining elements 3 and/or individual support plates 7 with lining elements 3 held on it. This represents an important advantage with respect to known constructions with a so-called dovetail guide, wherein one-piece brake linings, after they are worn out, must be exchanged together with their lining support, while the construction of the brake lining according to the invention provides another use of the lining support and possibly also of the support plates.

I claim:

1. A brake lining for partial-lining disc brakes comprising:
   a support body;
   a plurality of support plates being swivellably held on the support body;
   a plurality of lining elements mating with said support plates at a ball-and-socket joint;
   a plurality of holding elements mounting the lining elements to the support plates; and
   a spring on each holding element biasing the lining elements and support plates towards each other.

2. A brake lining according to claim 1, wherein the lining elements include a universal ball joint in a ball socket of the support plates.

3. A brake lining according to claim 1, wherein
   several group elements are provided per lining half which are each formed of plural lining elements and a support plate,
   the group elements have an introduction point of the lining contact pressure forces on their center of gravity, and
   the centers of gravity of at least three group elements of each lining half form a triangle whose center of gravity forms the force introduction point of half the overall brake application force per brake lining for each disc side.

4. A brake lining according to claim 3, wherein the support body includes a plate-shaped lining support and a lining holder of the disc brake, the group elements are swivellably linked to the lining support, and the lining support is fastened to the lining holder in a quickly detachable manner.

5. A brake lining according to claim 3, wherein the support body includes a lining holder of the disc brake, and the group elements are swivellably arranged directly on the lining holder.

6. A brake lining according to claim 3, wherein the support body includes a lining holder of the disc brake, and the support plates are swivellably arranged directly on the lining holder.

7. A brake lining according to claim 1, wherein the support body includes a plate shaped lining support and a lining holder of the disc brake, the support plates each carry a single lining element and are swivellably linked to the plate-shaped lining support, and the lining support is fastened on the lining holder.

8. A brake lining according to claim 1, wherein the support body includes a lining holder of the disc brake, and the support plates each support a single lining element and are swivellably arranged directly on the lining holder.

9. A brake lining according to claim 1, wherein said support body includes a lining support, a lining holder of the disc brake and, in the area of the introduction of force of the two lining halves, one spacer plate respectively between the lining support and the lining holder such that the force transmission takes place from the lining holder to the lining support in the area of the spacer plate.

10. A brake lining according to claim 1, wherein said support body includes a lining support, the support plates are linked to the lining support, and the lining support can be swivelled in the area of its center line to a limited extent about this center line.

11. A brake lining according to claim 10, wherein the lining support includes a weakening of the material in the area of its center line.

12. A brake lining according to claim 1, wherein said support body includes a lining holder of the disc brake, said support plates are linked directly to the lining holder, and the lining holder can be swivelled in the area of its center line to a limited extent about this center line.

13. A brake lining according to claim 12, wherein the lining holder includes a weakening of the material situated in the area of the center line of the lining holder.

14. A brake lining according to claim 1, wherein the support body includes a plate-shaped lining support and a lining holder of the disc brake, the support plates are swivellably linked to the lining support, and the lining support is fastened to the lining holder in a quickly detachable manner.

* * * * *